United States Patent
Vinayagamurthy et al.

(10) Patent No.: US 11,727,157 B2
(45) Date of Patent: Aug. 15, 2023

(54) BUILDING AN ENCRYPTED DOCUMENT STORE

(71) Applicant: International Business Machines Corporation, Armonk, NY (US)

(72) Inventors: Dhinakaran Vinayagamurthy, Erode (IN); Akshar Kaul, Bangalore (IN); Santosh Ravi Kiran Penubothula, Vijayawada (IN); Pankaj Satyanarayan Dayama, Bangalore (IN); Vinayaka Pandit, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/382,685

(22) Filed: Jul. 22, 2021

(65) Prior Publication Data
US 2023/0022338 A1    Jan. 26, 2023

(51) Int. Cl.
*H04L 9/06* (2006.01)
*G06F 21/78* (2013.01)

(52) U.S. Cl.
CPC ............ *G06F 21/78* (2013.01); *H04L 9/0618* (2013.01); *H04L 9/0637* (2013.01)

(58) Field of Classification Search
CPC ...... H04L 9/0618; H04L 9/0637; G06F 21/78
See application file for complete search history.

(56) References Cited

U.S. PATENT DOCUMENTS

| 10,599,621 B1* | 3/2020 | Wu ........................ G06F 16/182 |
| 2013/0103729 A1* | 4/2013 | Cooney ................. G06F 16/252 707/831 |
| 2016/0013933 A1* | 1/2016 | Teranishi .............. H04L 9/0662 380/28 |
| 2016/0378819 A1 | 12/2016 | Bishop et al. |
| 2019/0087601 A1* | 3/2019 | Molyneaux ......... G06F 21/6227 |
| 2022/0043585 A1* | 2/2022 | Senyuk ................. G06F 3/0647 |

OTHER PUBLICATIONS

Enabling Encrypted Rich Queries in Distributed Key-Value Stores, by Wang et al., published 2018 (Year: 2018).*
Cryptographically_Secure_Information_Flow_Control_on_Key-Value_Stores, by Russo et al., published 2017 (Year: 2017).*
Leler, Wm, Adding Encryption to a Fast Database, Without Compromise, published in Hackemoon, available at https://hackemoon.com/adding-encryption-to-a-fast-database-without-compromise-5u3b3yth, Apr. 2, 2020.

(Continued)

*Primary Examiner* — Vu V Tran
(74) *Attorney, Agent, or Firm* — Ryan, Mason & Lewis, LLP

(57) ABSTRACT

Methods, systems, and computer program products for building an encrypted document store are provided herein. A computer-implemented method includes building an encrypted ordered key-value store; encrypting one or more sensitive keys to be stored in the ordered key-value store using an order preserving encryption scheme; storing a state of the order preserving encryption scheme in the ordered key-value store; and encrypting one or more values corresponding to the one or more sensitive keys using a semantically secure encryption scheme.

20 Claims, 7 Drawing Sheets

(56) References Cited

OTHER PUBLICATIONS

Chrysafis C, Collins B, Dugas S, Dunkelberger J, Ehsan M, Gray S, Grieser A, Hermstadt O, Lev-Ari K, Lin T, McMahon M. Foundationdb record layer: A multi-tenant structured datastore. InProceedings of the 2019 International Conference on Management of Data, Jun. 25, 2019 (pp. 1787-1802).

Bienko, Christopher et al, IBM Cloudant: Database as a Service Fundamentals, IBM, available at: http://www.redbooks.ibm.com/redpapers/pdfs/redp5126.pdf, last accessed Jul. 22, 2021.

System and Method for building an Order Preserving Symmetric Encryption Scheme From Secure Non-Order Preserving Cryptographic Primitives, published in An IP.com Prior Art Database, available at https://priorart.ip.com/IPCOM/000259523, published Aug. 19, 2019.

Kim, Kee Sung et al., Security of Stateful Order-Preserving Encryption, published in Information Security and Cryptology—ICISC 2017, available at https://www researchgate.net/publication/323897456, Jan. 2018.

Popa, Raluca Ada, Frank H. Li, and Nickolai Zeldovich. "An ideal-security protocol for order-preserving encoding." 2013 IEEE Symposium on Security and Privacy. IEEE, 2013.

Mell, Peter, et al., The NIST Definition of Cloud Computing, National Institute of Standards and Technology, U.S. Department of Commerce, NIST Special Publication 800-145, Sep. 2011.

* cited by examiner

BUILDING AN ENCRYPTED DOCUMENT STORE

BACKGROUND

The present application generally relates to information technology and, more particularly, to building an encrypted document store using an ordered key-value store as the storage layer.

A document data store is a database that uses a document-oriented model to store data. Generally, document data stores are represented in JSON, where each document is itself a complex data structure. Documents can include nested structures of various data types, and users can query these structures, retrieving or updating the document, or portions of it, without locking down the database. Documents are stored and retrieved through a unique primary key.

SUMMARY

In one embodiment of the present disclosure, techniques for building an encrypted document store are provided. An exemplary computer-implemented method includes the steps of building an encrypted ordered key-value store; encrypting one or more sensitive keys to be stored in the ordered key-value store using an order preserving encryption scheme; storing a state of the order preserving encryption scheme in the ordered key-value store; and encrypting one or more values corresponding to the one or more sensitive keys using a semantically secure encryption scheme.

Another embodiment of the present disclosure or elements thereof can be implemented in the form of a computer program product tangibly embodying computer readable instructions which, when implemented, cause a computer to carry out a plurality of method steps, as described herein. Furthermore, another embodiment of the present disclosure or elements thereof can be implemented in the form of a system including a memory and at least one processor that is coupled to the memory and configured to perform noted method steps. Yet further, another embodiment of the present disclosure or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present disclosure will become apparent from the following detailed description of illustrative embodiments thereof, which is to be read in connection with the accompanying drawings.

DETAILED DESCRIPTION

Existing solutions related to document data stores often require a tradeoff between manageability and security. For example, some solutions use trusted hardware for the entire database management system. Although this increases security, trusted hardware also introduces challenges with manageability (e.g., reduced flexibility, limited trusted memory, and limitations to geo-distribution).

Illustrative embodiments described herein enable secure document data stores without the need for trusted hardware. Such techniques include encrypting keys of secondary indexes of the document data store that include sensitive data (such as, customer data, personal data, and/or regulated data, for example). For example, a user may mark one or more JSON attributes as sensitive, and if a secondary index is created for that attribute, the attributes are encrypted using an order-preserving symmetric encryption scheme.

Example embodiments include building an encrypted ACID (atomicity, consistency, isolation, durability) compliant ordered key-value store with optimal security. In one embodiment, each sensitive key that is to be stored in a key-value store is encrypted using an Indistinguishability under Ordered Chosen Plaintext Attack (IND-CPA) compliant order preserving encryption scheme. The state of the IND-OCPA compliant order preserving encryption scheme may be stored in the same ordered key-value store. Additionally, such an embodiment can include dynamically deciding the data model that is to be used for storing the state of the encryption scheme. Accordingly, different parts of the state may use different data models. At least one embodiment includes ensuring operations performed on the state of the encryption scheme adhere to transaction limits imposed by the underlying key-value store. The values stored in the key-value store, in some embodiments, may be encrypted using a semantically secure encryption scheme, for example.

Another example of an embodiment includes building an encrypted document store using an ACID compliant ordered key-value store as the storage layer. For example, such embodiments may include composing a single logical transaction across various layers of the encrypted document store by providing consistency between parallel operations (e.g., insertion, query, and delete operations) via a signaling mechanism. The same key-value store may also be used to store the signals corresponding to the signaling mechanism. Some embodiments also include dynamically mapping how user data (e.g., a document) is mapped to plaintext for the order preserving compliant encryption scheme, thus enabling different parts of user data to be mapped differently.

Figure 1:
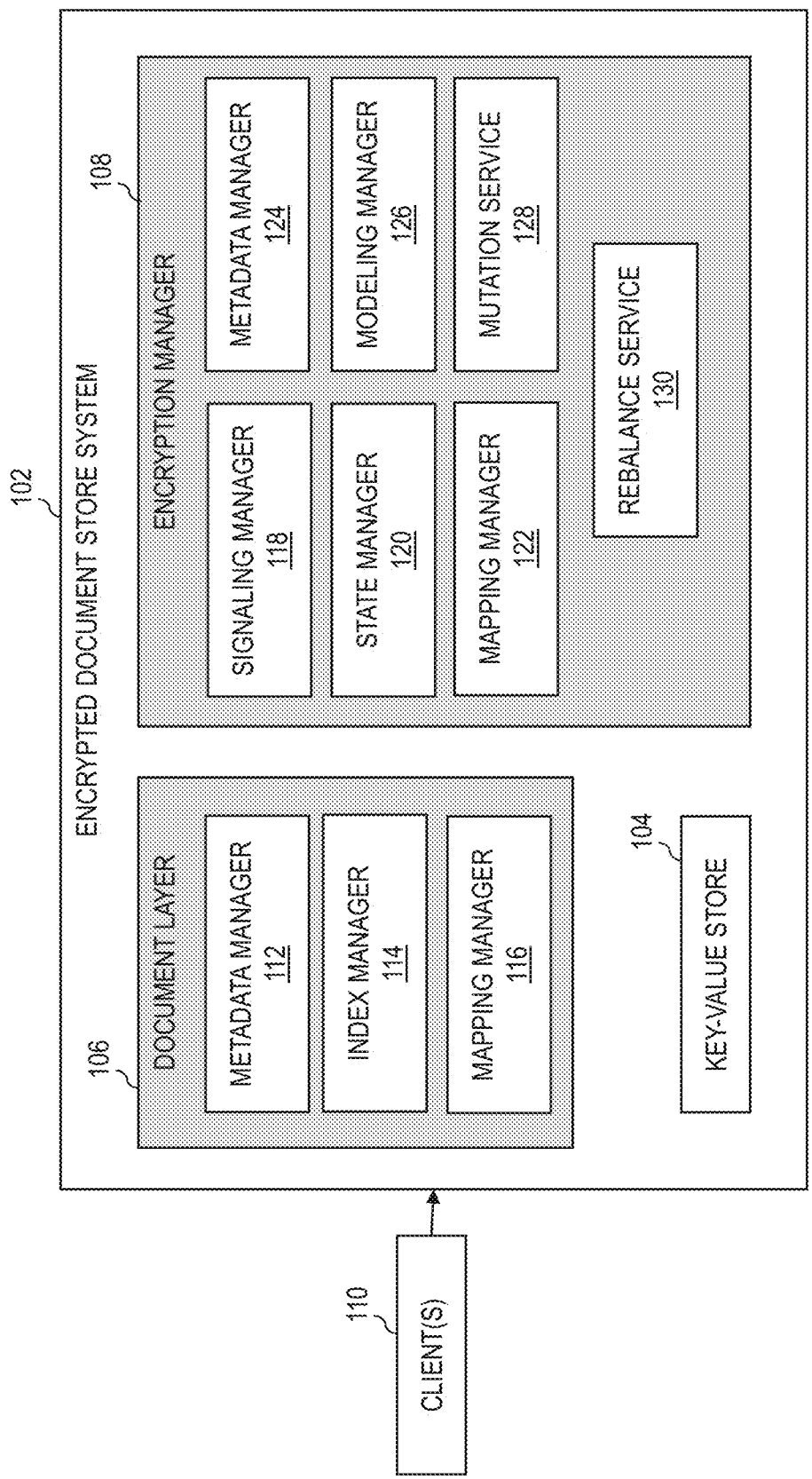
FIG. 1 is a diagram illustrating a system architecture in accordance with exemplary embodiments.

FIG. 1 is a diagram illustrating a system architecture in accordance with exemplary embodiments. By way of illustration, FIG. 1 depicts an encrypted document store system 102, which includes a key-value store 104, a document layer 106, and an encryption manager 108. Also shown in FIG. 1 are one or more clients 110 which interact with the encrypted document data store.

In at least one example embodiment, the encrypted document store system 102 corresponds to a fully managed, distributed JSON document database architecture (e.g., a Cloudant architecture).

The document layer 106 includes a metadata manager 112, an index manager 114, and a mapping manager 116. The encryption manager 108 includes a signaling manager 118, a state manager 120, a mapping manager 122, a metadata manager 124, a modeling manager 126, a mutation service 128, and a rebalance service 130. Such components are described in more detail elsewhere herein. In one example embodiment, the encryption manager 108 corresponds to an order preserving encryption (OPE) manager.

The key-value store 104, in some example embodiments, may be implemented at least in part using FoundationDB, which is an open-source multi-model distributed NoSQL database. The core database exposes an ordered key-value store with transactions, and the transactions are able to read or write multiple keys stored on any machine in the cluster while fully supporting ACID properties. Transactions are used to implement a variety of data models via layers. The key-value store 104 may correspond to a distributed ordered key-value data store, where the keys and values are simple byte strings, and the keys are treated as members of a total order.

The document layer 106 may convert a document (e.g., a JSON document) to multiple key-value pairs corresponding to the key-value store 104. The index manager may maintain a primary index with document identifier and document pairs (e.g., <doc id>: <j son document>), where the value (document) is encrypted using a semantically secure encryption scheme, such as by using an Advance Encryption Standard with Galois/Counter (AES-GCM) mode, for example. Generally, the document identifier (doc id) is not considered sensitive.

Generally, the metadata manager 112 manages the metadata associated with the stored documents. The metadata may include information pertaining to an owner of the document, collection of the document, and versioning information about the document, as non-limiting examples. The index manager 114 maintains indexes that are created for the stored documents. As those skilled in the art will appreciate, various indexes may be created, and it is the responsibility of the index manager 114 to ensure that all the indexes are updated appropriately. The mapping manager 116 is responsible for mapping a user document to the data model used by the actual storage layer (corresponding to the key-value store 104, for example). It is noted that FIG. 1 shows a key-value store 104, however, it is to be appreciated that a document store may use various different storage layers such as, for example, key-value store 104, a relational database management system, or a custom storage engine, for example. The mapping manager 116 converts user documents (e.g., JSON documents) into a form that can be stored in the underlying storage layer.

In some embodiments, a secondary index is created, which is built over some attribute of the document. The secondary index may be represented using the following format: <attribute value>||<doc id>: " ".

The secondary index allows faster processing of queries based on the attribute. The secondary index keys, in some example embodiments, are encrypted by the encryption manager 108 using an order preserving encryption (OPE) scheme that only reveals order of keys. In some examples, the OPE scheme corresponds to an IND-OCPA compliant encryption scheme, for example. The IND-OCPA compliant encryption scheme maintains a dynamic state across encryption (stateful) and can change a ciphertext for plaintext over time as new values are encrypted (mutable).

Generally, the state manager 120 manages the state of the OPE scheme and stores it in the key-value store 104, and the mapping manager 122 is responsible for mapping how the data in the user documents is mapped to plain text keys of the encryption scheme. As an example, if two different documents have the same value for an attribute then the mapping manager 122 determines whether the documents will be assigned the same plaintext with respect to the encryption scheme or be assigned different plain texts. Additionally, the metadata manager 124 manages the metadata associated with encryption. For example, the metadata may include, for example, encryption keys, an encryption algorithm, and the location of the state. If multiple secondary indexes have been defined on the document, then the metadata manager 124 may enable these secondary indexes to have independent encryption keys and encryption algorithms, for example.

The modeling manager 126 manages the serialization and deserialization of the state into the key-value store 104. For example, the modeling manager 126 maps the state into a set of key-value pairs that are then persisted in the key-value store 104. It is to be appreciated that this mapping may be performed in different ways. As a non-limiting example, the whole state can be mapped to a single key-value pair, in which case the whole state can be accessed in one roundtrip to the key-value store 104. As another example, the state may be divided into multiple parts and each part may be stored as an independent key-value pair. In this example, parts of the state can be accessed independently of each other. However, it is note that if information from more than one part of state is needed, then it can lead to multiple round trips to the key-value store 104.

In some embodiments, different mappings may have different characteristics. For example, it is noted that there is a tradeoff between the number of roundtrips to the key-value store 104 and segments of the state accessed during each roundtrip. Accessing multiple segments reduces the number of roundtrips but can cause conflicts during concurrent updates. Thus, the modeling manager 126 may account for different parts of the state having different access characteristics.

The modeling manager 126 also tracks the parts of the state being accessed, their respective mappings, and the number of conflicts. Based on these inputs, the modeling manager 126 may dynamically decide the mapping for new parts of state and dynamically remap existing parts of the state. It is noted that this does not affect other data (e.g., user data).

In some example embodiments, the state of the OPE scheme is maintained as a B+ tree, which stores unique values that have been currently encrypted. In such an embodiment, the B+ tree may be stored in the key-value store 104 as: [NodeID (i): (NodeContents (i))_RAND], where i∈[#splits]. The number of splits (i.e., #splits) may be decided adaptively for each NodeID depending on one or more parameters, such as access patterns and conflicts, for example.

As an example, the modeling manager 126 may store the B+ tree in the key-value store 104 as a set of nodes, where each node has a unique node identifier and is initially stored as a single part. The modeling manager 126 tracks the number of conflicts per node. The modeling manager 126 may also utilize the following functions:

GetNode (NodeID, Part): get the part of the node; and if the part is negative then get whole node.

PutNode (NodeID, Node, Part): write the part of the node to the underlying key-value store; and if part is negative then write whole node.

SplitNode (NodeID, Parts): split the node having the NodeID into the given number of parts.

During any operation on the tree, if the transaction fails due to a conflict, then the modeling manager 126 increments the number of conflicts for that node. If the number of conflicts for a given node exceeds a specified threshold, then the modeling manager 126 divides the node into at least one more part.

As noted herein, the user data (e.g., documents from clients 110) are mapped into a set of key-value pairs. For sensitive keys, the user data key is converted to OPE plaintext. Different conversions have different characteristics. For example, a tradeoff exists between the number of unique values (size of state), number of inserts that cause the OPE mutation, and the number of data mutations per OPE mutation. If the size of the state is large, then the number of inserts that cause OPE mutations increases, the number of data mutations each OPE mutation can trigger decreases, and it also uses more storage. Determining a favorable (e.g., optimal) conversion depends on the characteristics of the data, which can dynamically change over time.

Accordingly, the mapping manager 122 is responsible for converting the user data key to OPE Plaintext. To do this the mapping manager 122 tracks various parameters including the conversion used for various parts of data, size of the state, mutation statistics, and data statistics, for example. When a new user data key needs to be converted, the mapping manager 122 checks these parameters and decides on the conversion. The mapping manager 122 dynamically reconverts existing parts of data based on these parameters, which also leads to data mutations.

In some embodiments, user keys are converted using a one-to-one (1:1) conversion process or a one-to-many (1:N) conversion process. In the 1:1 conversion process, each user data key is converted to a unique OPE plaintext. The 1:1 conversion process increases the size of the state relative to the 1:N conversion process. The number of values encrypted by the OPE scheme is equal to the aggregate number of values in the document attribute being secured. This increases the number of inserts that can cause mutation relative to the 1:N conversion process. This conversion has the property that each OPE mutation leads to exactly one data mutation. Thus, 1:1 conversion may be expressed as follows: [arg_val:docIDs] as [K:V]=>[K_OPE:V_RAND], where K_OPE is the OPE ciphertext of K, and V_RAND is the RAND encryption of V. This conversion process hides the number of docIDs related to arg_val.

In the 1:N conversion process, each unique user data key is converted to an OPE plaintext. The state of the 1:N conversion process is smaller as compared to the 1:1 conversion process. The number of values encrypted by the OPE scheme is equal to the number of unique values in the document attribute being secured. This decreases the number of inserts that can cause mutation relative to the 1:1 conversion process. This conversion has the property that each OPE mutation can lead to multiple data mutations. The 1:N conversion process may be express as [arg_val:docIDs] as [K:V]=>[K_OPE∥docID1:NULL], [K_OPE∥docID2:NULL], . . . [K_OPE∥docIDN:NULL]. It is noted that the 1:N conversion process generally works better with concurrent inserts and updates into the secondary index.

Figure 2:
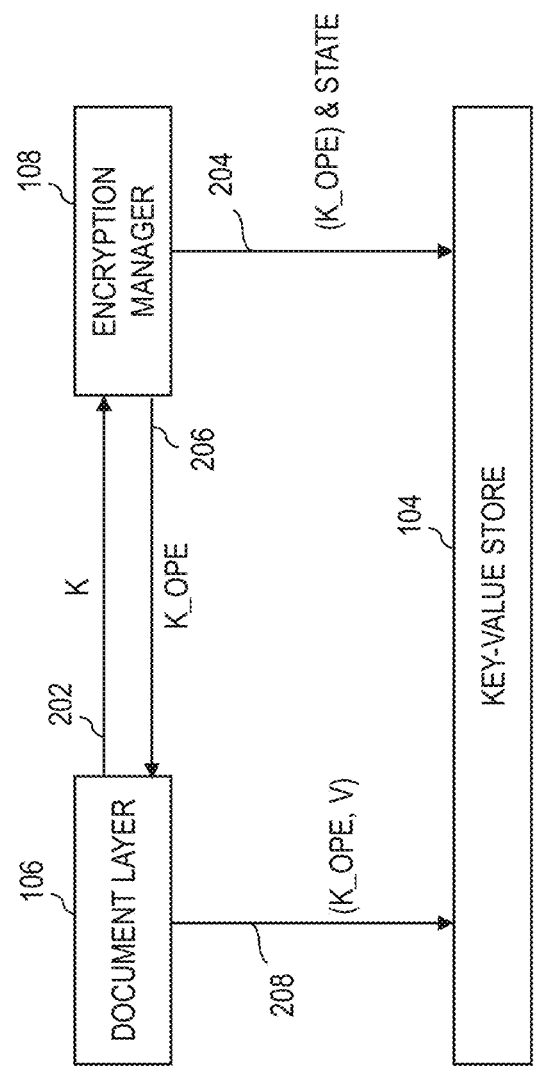
FIG. 2 is a diagram illustrating a process where a data inconsistency problem may occur.

Referring also to FIG. 2, this figure shows an example of a process where a data inconsistency problem may occur. Step 202 includes document layer 106 sending a key, K, to the encryption manager 108. Step 204 includes encryption manager sending the ciphertext of K (K_OPE) and the corresponding state to the key-value store 104. Step 206 includes returning K_OPE to the document layer 106. Step 208 includes the document layer 106 using K_OPE to send the corresponding value, V, to the key-value store 104. It is noted that K_OPE can change between steps 204 and 208 due to mutations caused by concurrent inserts. This can lead to inconsistencies between the user data and the state of the encryption scheme, causing the correctness of the system to be lost. Additionally, it is not always possible to have the steps shown in FIG. 2 run in the same transaction as the document layer 106 and encryption manager 108 manager may be on separate servers.

As such, at least some embodiments include composing a single logical transaction across various layers of the encrypted document store system 102 by providing consistency between parallel operations (e.g., insertion, query, and delete operations) via a signaling mechanism.

Figure 3:
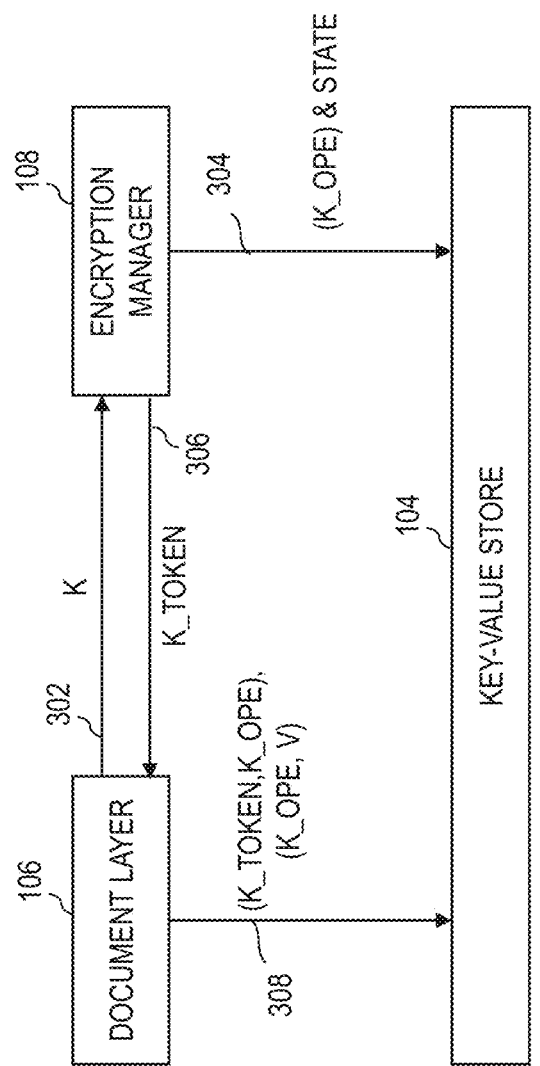
FIG. 3 is a diagram illustrating a signaling process in accordance with exemplary embodiments.

Referring now to FIG. 3, this figure shows an example of a signaling process in accordance with illustrative embodiments. The signaling process addresses the issues described above in conjunction with FIG. 2. In the FIG. 3 embodiment, the key-value store is used for storing signals to handle scenarios where all servers are stateless. In particular, Step 302 includes document layer 106 sending a key, K, to the encryption manager 108. Step 304 includes the encryption manager sending the ciphertext of K (K_OPE) and the corresponding state to the key-value store 104. Step 306 includes the encryption manager 108 creating and returning a new token (K_Token) to the document layer 106. Step 308 is a single transaction that is performed by the document layer, which includes both converting K_Token to K_OPE and using K_OPE to send the corresponding value, V, to the key-value store 104. It is noted that the K_Token to K_OPE mapping is stored in the key-value store 104, and the encryption manager 108 maintains consistency between the tokens and state. The duration for maintaining token may be configurable, and the properties of K_Token may be adjusted for providing different security guarantees, for example.

In some example embodiments, the signaling mechanism may include, for example, performing the following steps for a transformation of a key, K, by the encryption manager 108:
  1) Find K in the state and get K_OPE;
  2) Create new token (K_Token);
  3) Store K_Token and K_OPE in a "lookup";
  4) Return K_Token as output.

Each entry that is in the lookup can be associated with a "time to live" (e.g., timer), and expired entries may be cleaned from the lookup by a background thread of the encrypted document store system 102. The encryption manager 108 keeps the lookup updated with any changes happening to the state of the OPE scheme.

Additionally, the document layer 106 may perform the following steps for a given operation:
  1) Start transaction;
  2) Lookup K_Token to get K_OPE;
  3) Use K_OPE;
  4) End Transaction.

In one or more embodiments, the encryption manager 108 maintains active foreground services for insert and query operations from the document layer 106. Further, the encryption manager 108 may provide background services for encryption specific tasks, such as a mutation service 128 and rebalance service 130, for example. Each service may run as a separate transaction with key-value store 104.

The signaling by a background service may include, for example, writing appropriate signals to the key-value store 104 to ensure that conflicting changes by foreground services go through. If there are conflicting changes by another foreground or background service, then only one of them can succeed, and the remainder of the conflicting services will have to retry their transactions. In some embodiments, constraints may be put on the signal to reduce unnecessary conflicts.

As described in more detail elsewhere herein, various components of the document layer 106 and the encryption manager 108 interact with the key-value store 104. Each such component interacts with the key-value store 104 as a single independent transaction. In at least some example embodiments, the encrypted document store system 102 is designed in such a way so that it appears the work associated with multiple single independent transactions is being performed in a single logical transaction. This ensures consistency is maintained between all of the components of the document layer 106 and the encryption manager 108, even though each of them is using independent transactions.

The underlying key-value store 104 may have certain limits on transactions (e.g., FoundationDB limits transactions to 5 seconds and 10 MB). The encrypted document store system 102, in some embodiments, ensures that such limits are adhered to. For example, the state manager 120 of encryption manager 108 performs multiple operations over the state of the encryption scheme. If all of the operations are performed in a single transaction with the key-value store 104, then a transaction failure may occur, which limits concurrency. Performing one operation per transaction with the key-value store 104 can lead to degraded performance due to the overhead of transaction management paid per operation. The state manager 120 can maintain various information (e.g., Transaction failure rate and operations per transaction) for different parts of the state. Thus, when the state manager 120 needs to perform an operation over the state, the information can be used to decide the appropriate number of operations to use per transaction. Accordingly, the number of operations for different parts of the state can be optimally selected. In some embodiments, the selection may be based on factors associated with user key conversion and state modeling as well.

In an example embodiment, a mutation process may be performed by the mutation service 128 which includes mutating one value at a time to minimize transaction failures. For example, consider a scenario where an insert operation needs to mutate mappings of existing plaintext values. In such a scenario, the mutation service 128 is notified to mutate in-order predecessor/successor of a new value. In this situation, a token is returned, but the (token, OPE) signal may be missing. The document layer 106 will poll periodically to obtain the signal. According to some example embodiments the mutation service may obtain a queue of values and a direction (up or down) as input and perform the following function:
1) Select a value from queue;
2) Run binary search to value;
3) If space is available in the specified direction, then mutate state and user data in a single transaction; and remove value from the queue and return.
4) If space is not available, then notify the mutation service 128 to run with in-order predecessor/successor and return from the function.

Additionally, the rebalance service 130 may run as a background service to minimize transaction failures, such as when other transactions update the state concurrently. For example, consider a scenario where an insert operation needs rebalancing to maintain performance guarantees. The rebalance service 130 is notified to balance the node with value, while the insert operation continues normally and returns the corresponding token. In one example embodiment, the rebalance service 130 may obtain a queue of values as input and perform the following function:
1) Select a value from the queue;
2) Runs a binary search to get node with the value;
3) Rebalance one or more nodes in the path, if needed;
4) If further rebalancing needed, then add the values in the node which require rebalancing to queue, and remove the current value from queue and return from the function.

Figure 4:
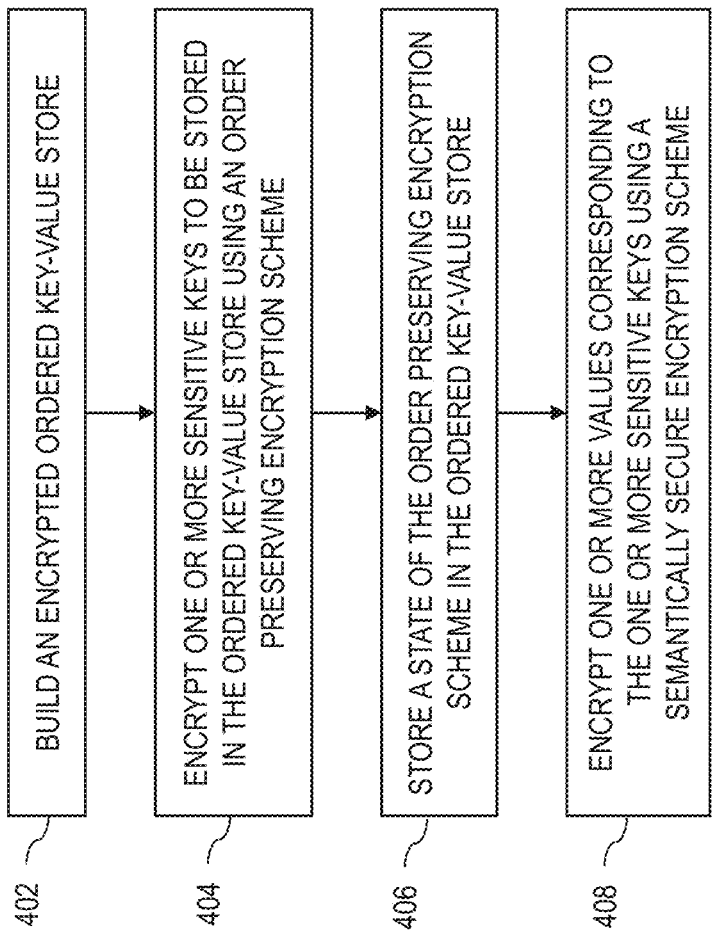
FIG. 4 is a flow diagram illustrating techniques for building an encrypted document store in accordance with exemplary embodiments.

FIG. 4 is a flow diagram illustrating techniques in accordance with exemplary embodiments. Step 402 includes building an encrypted ordered key-value store. Step 404 includes encrypting one or more sensitive keys to be stored in the ordered key-value store using an order preserving encryption scheme. Step 406 includes storing a state of the order preserving encryption scheme in the ordered key-value store. Step 408 includes encrypting one or more values corresponding to the one or more sensitive keys using a semantically secure encryption scheme.

The order preserving encryption scheme may include an indistinguishability under ordered chosen plaintext attack compliant encryption scheme. The process may further include a step of dynamically selecting one of a plurality of data models to be used for storing the state of the order preserving encryption scheme. Different parts of the state may use different ones of the plurality of data models. The process may further include a step of adhering to one or more transaction limits of the ordered key-value store when operations are performed on the state of the order preserving encryption scheme. The encrypted ordered key-value store may comply with atomicity, consistency, isolation, and durability (ACID) properties and may be used as a storage layer of an encrypted document store. The process may further include a step of composing a single logical transaction across multiple layers of the encrypted document store by applying a signaling mechanism that maintains consistency of parallel operations. The parallel operations may include at least one of: insertion operations, query operations, and delete operations. The process may further include a step of storing signals associated with the signaling mechanism in the same encrypted ordered key-value store. The process may further include a step of dynamically mapping how one or more parts of document data of the encrypted document store is mapped to plaintext for the order preserving encryption scheme. The state may be stored in the same ordered key-value store that is used to store user data.

The techniques depicted in FIG. 4 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the present disclosure, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 4 can be implemented via a computer program product that can include computer useable program code that is stored in a computer readable storage medium in a data processing system, and wherein the computer useable program code was downloaded over a network from a remote data processing system. Also, in an embodiment of the present disclosure, the computer program product can include computer useable program code that is stored in a computer readable storage medium in a server data processing system, and wherein the computer useable program code is downloaded over a network to a remote data processing system for use in a computer readable storage medium with the remote system.

An exemplary embodiment or elements thereof can be implemented in the form of an apparatus including a memory and at least one processor that is coupled to the memory and configured to perform exemplary method steps.

Figure 5:
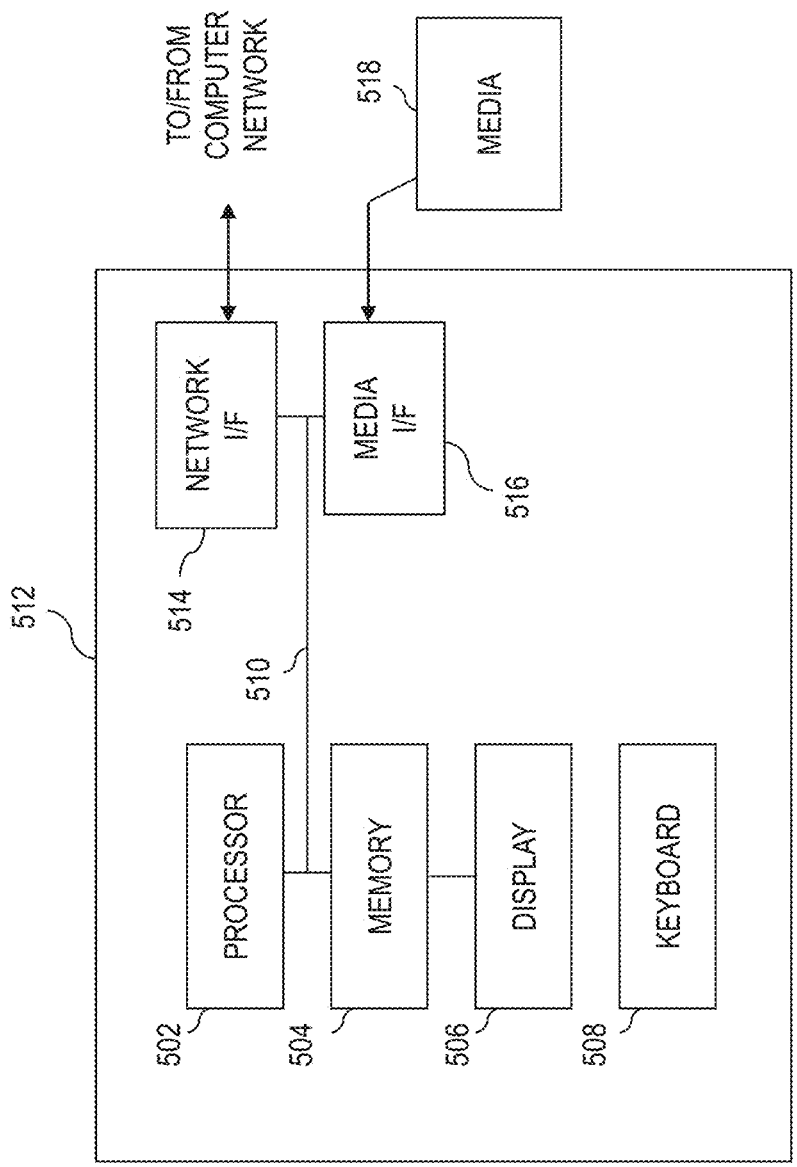
FIG. 5 is a system diagram of an exemplary computer system on which at least one embodiment of the present disclosure can be implemented.

Additionally, an embodiment of the present disclosure can make use of software running on a computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the present disclosure, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

An exemplary embodiment may include a system, a method, and/or a computer program product at any possible technical detail level of integration. The computer program product may include a computer readable storage medium (or media) having computer readable program instructions thereon for causing a processor to carry out exemplary embodiments of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present disclosure.

Embodiments of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 502. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings provided herein, one of ordinary skill in the related art will be able to contemplate other implementations of the components.

Additionally, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
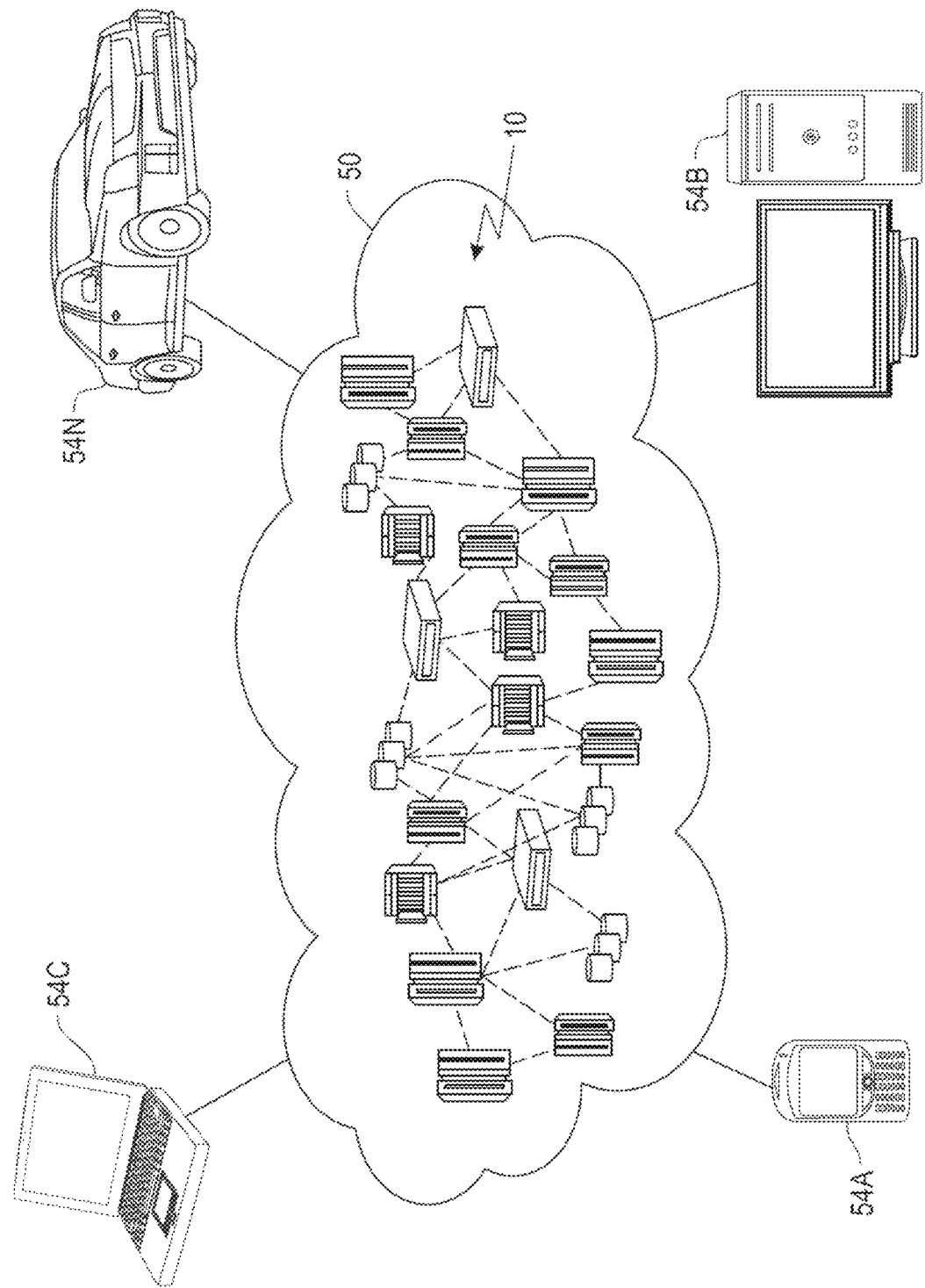
FIG. 6 depicts a cloud computing environment in accordance with exemplary embodiments.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
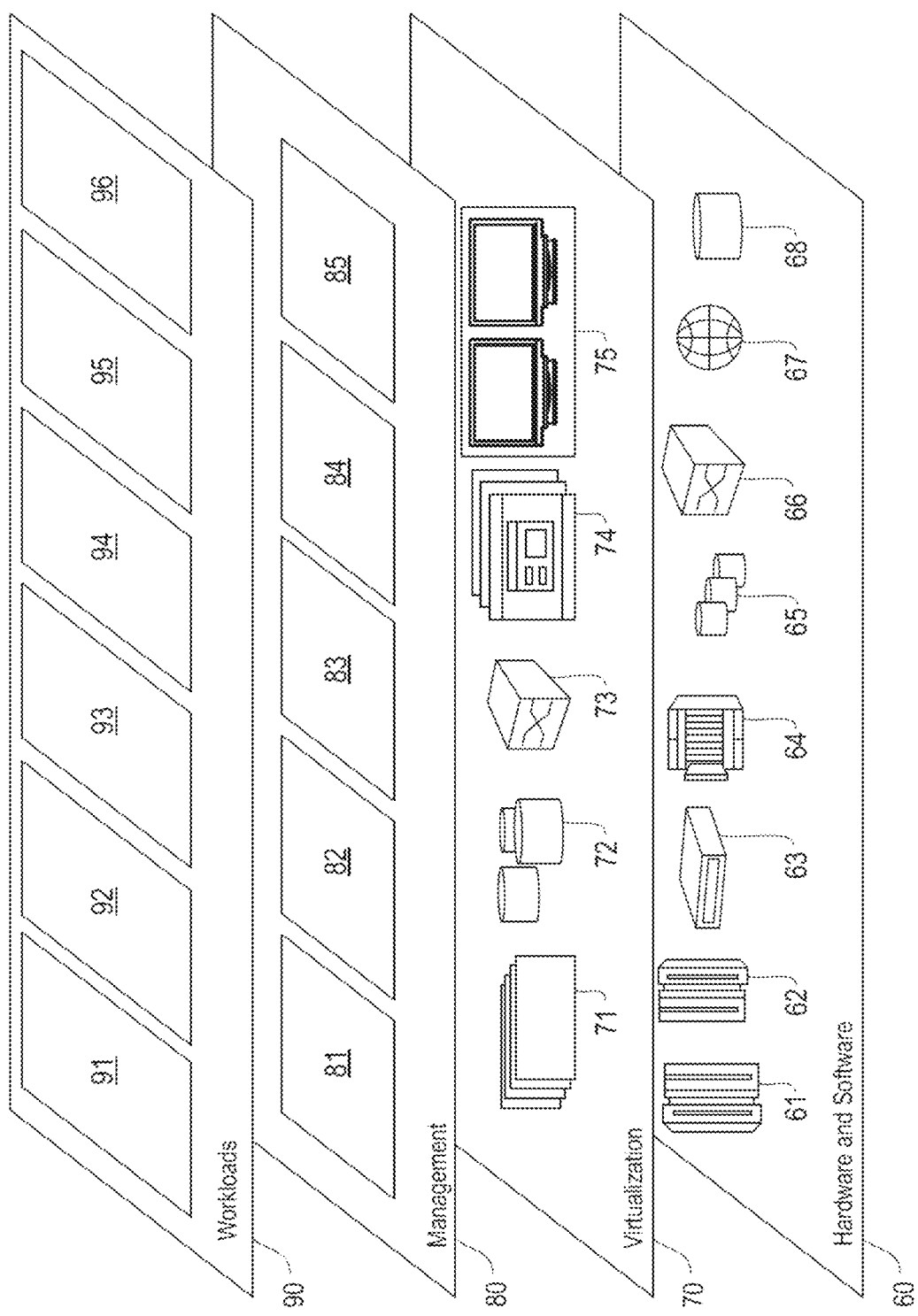
FIG. 7 depicts abstraction model layers in accordance with exemplary embodiments.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and building an encrypted document store 96, in accordance with the one or more embodiments of the present disclosure.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present disclosure may provide a beneficial effect such as, for example, increasing security of document data stores.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:
   building an encrypted ordered key-value store;
   encrypting one or more sensitive keys to be stored in the ordered key-value store using an order preserving encryption scheme;
   storing a state of the order preserving encryption scheme in the ordered key-value store wherein the storing comprises dynamically selecting one of a plurality of data models to be used for storing the state of the order preserving encryption scheme; and
   encrypting one or more values corresponding to the one or more sensitive keys using a semantically secure encryption scheme;
   wherein the method is carried out by at least one computing device.

2. The computer-implemented method of claim 1, wherein the order preserving encryption scheme comprises an indistinguishability under ordered chosen plaintext attack compliant encryption scheme.

3. The computer-implemented method of claim 1, wherein different parts of the state use different ones of the plurality of data models.

4. The computer-implemented method of claim 1, comprising:
   adhering to one or more transaction limits of the ordered key-value store when operations are performed on the state of the order preserving encryption scheme.

5. The computer-implemented method of claim 1, wherein the encrypted ordered key-value store complies with atomicity, consistency, isolation, and durability properties, and is used as a storage layer of an encrypted document store.

6. The computer-implemented method of claim 5, comprising:
   composing a single logical transaction across multiple layers of the encrypted document store by applying a signaling mechanism that maintains consistency of parallel operations.

7. The computer-implemented method of claim 6, wherein the parallel operations comprise at least one of: insertion operations, query operations, and delete operations.

8. The computer-implemented method of claim 6, comprising:
   storing signals associated with the signaling mechanism in the same encrypted ordered key-value store.

9. The computer-implemented method of claim 5, comprising:
   dynamically mapping how one or more parts of document data of the encrypted document store is mapped to plaintext for the order preserving encryption scheme.

10. The computer-implemented method of claim 1, wherein the state is stored in the same ordered key-value store that is used to store user data.

11. The computer-implemented method of claim 1, wherein software is provided as a service in a cloud environment.

12. A computer program product comprising a computer readable storage medium having program instructions embodied therewith, the program instructions executable by a computing device to cause the computing device to:
   build an encrypted ordered key-value store;
   encrypt one or more sensitive keys to be stored in the ordered key-value store using an order preserving encryption scheme;
   store a state of the order preserving encryption scheme in the ordered key-value store, wherein the storing comprises dynamically selecting one of a plurality of data models to be used for storing the state of the order preserving encryption scheme; and
   encrypt one or more values corresponding to the one or more sensitive keys using a semantically secure encryption scheme;
   wherein the method is carried out by at least one computing device.

13. The computer program product of claim 12, wherein the order preserving encryption scheme comprises an indistinguishability under ordered chosen plaintext attack compliant encryption scheme.

14. The computer program product of claim 12, wherein the program instructions executable by a computing device cause the computing device to:
   adhere to one or more transaction limits of the ordered key-value store when operations are performed on the state of the order preserving encryption scheme.

15. The computer program product of claim 12, wherein the encrypted ordered key-value store complies with atomicity, consistency, isolation, and durability properties and is used as a storage layer of an encrypted document store.

16. The computer program product of claim 15, wherein the program instructions executable by a computing device cause the computing device to:
   compose a single logical transaction across multiple layers of the encrypted document store by applying a signaling mechanism that maintains consistency of parallel operations.

17. The computer program product of claim 12, wherein the state is stored in the same ordered key-value store that is used to store user data.

18. A system comprising:
a memory configured to store program instructions;
a processor operatively coupled to the memory to execute the program instructions to:
build an encrypted ordered key-value store;
encrypt one or more sensitive keys to be stored in the ordered key-value store using an order preserving encryption scheme;
store a state of the order preserving encryption scheme in the ordered key-value store, wherein the storing comprises dynamically selecting one of a plurality of data models to be used for storing the state of the order preserving encryption scheme; and
encrypt one or more values corresponding to the one or more sensitive keys using a semantically secure encryption scheme.

19. The system of claim 18, wherein the order preserving encryption scheme comprises an indistinguishability under ordered chosen plaintext attack compliant encryption scheme.

20. A computer-implemented method, the method comprising:
building an encrypted ordered key-value store, wherein the encrypted ordered key-value store complies with atomicity, consistency, isolation, and durability properties, and is used as a storage layer of an encrypted document store;
encrypting one or more sensitive keys to be stored in the ordered key-value store using an order preserving encryption scheme;
storing a state of the order preserving encryption scheme in the ordered key-value store;
encrypting one or more values corresponding to the one or more sensitive keys using a semantically secure encryption scheme; and
composing a single logical transaction across multiple layers of the encrypted document store by applying a signaling mechanism that maintains consistency of parallel operations;
wherein the method is carried out by at least one computing device.

* * * * *